United States Patent [19]
Welk

[11] Patent Number: 5,145,224
[45] Date of Patent: Sep. 8, 1992

[54] DEER DRAGGING AND HANGING DEVICE

[76] Inventor: Richard Welk, 150 Spur Cir., Wayzata, Minn. 55391

[21] Appl. No.: 666,844

[22] Filed: Mar. 8, 1991

[51] Int. Cl.$^5$ .......................... A22C 15/00; B65G 7/12
[52] U.S. Cl. .................................. 294/2; 294/81.56; 294/141; 294/153; 452/189
[58] Field of Search .................. 294/1.1, 2, 15, 26, 294/61, 67.3, 81.1, 81.21, 81.5, 81.56, 120, 126, 137, 141, 146, 153, 156, 158, 165, 167, 168, 170; 224/103, 921; 452/185-192

[56] References Cited

U.S. PATENT DOCUMENTS

| | | | |
|---|---|---|---|
| 1,020,843 | 3/1912 | Petersen | 452/189 |
| 1,091,988 | 3/1914 | Van Der Veen | 452/191 |
| 2,812,206 | 11/1957 | Brunn | 452/192 |
| 2,819,923 | 1/1958 | Anderson | 294/74 |
| 2,830,840 | 4/1958 | Johnson | 294/81.56 X |
| 3,188,130 | 6/1965 | Pietrowicz | 294/74 |
| 3,686,710 | 8/1972 | Shankland | 294/15 X |
| 3,752,525 | 8/1973 | Hanna et al. | 294/74 |
| 4,243,164 | 1/1981 | Burlison et al. | 294/153 X |
| 4,317,257 | 3/1981 | Engel | 294/74 X |
| 4,431,121 | 2/1984 | Bensette | 224/921 X |
| 4,529,240 | 7/1985 | Engel | 294/141 |
| 4,828,307 | 5/1989 | Sokol et al. | 294/2 X |
| 4,887,823 | 12/1989 | Hallett et al. | 224/921 X |
| 4,909,555 | 3/1990 | Blasi | 294/81.56 X |

Primary Examiner—Johnny D. Cherry
Attorney, Agent, or Firm—Hugh D. Jaeger

[57] ABSTRACT

A deer dragging and hanging system for engaging a deer for dragging or hanging of the deer. The system can be used by either a single person or two persons, and provides for either a single point of engagement or two points of engagement. The device includes a cylindrical member, a center yoke affixed to the cylindrical member, two handles at outer ends of the cylindrical member, and two V-screws threaded into nuts in the ends of the cylindrical member.

1 Claim, 4 Drawing Sheets

DEER DRAGGING AND HANGING DEVICE

BACKGROUND OF THE INVENTION

1. Field of the Invention

The present invention relates to a deer dragging and hanging device, and more particularly, pertains to a configured cylindrical member with a yoke and two handles and nuts at either end for engaging V-screws for either dragging of the deer through the woods or hanging of the deer from a tree, rafter or other member spaced from a ground plane.

2. Description of the Prior Art

It has been particularly difficult for deer hunters on shooting a deer to drag the deer out of the forest or the woods. If the deer cannot be loaded onto a vehicle, then it has to be manually dragged out, which is difficult and cumbersome.

Another problem has been that once the deer is brought out of the woods, to properly hang the deer to drain body fluids prior to or during the dressing of the deer.

The present invention overcomes the disadvantages of the prior art devices by providing a deer dragging and hanging device for readily securing and dragging a deer, as well as for securing and hanging of a deer.

SUMMARY OF THE INVENTION

The general purpose of the present invention is a deer dragging and hanging device for dragging of a deer through the woods and hanging the deer either in the woods or at a location prior to the dressing of the deer, such as from a tree, at one's home or at a meat processor.

One object of the present invention is a deer dragging and hanging device including a cylindrical member, handles at each end, a yoke secured at a center portion of the cylindrical member, nuts within each end of the cylindrical member, and V-screws for engaging through the legs of the deer and into each of the nuts. The deer dragging and hanging device can also be used to practice the appropriate processes for the dragging of a deer from the center yoke or the V-groove screw ends of the device, or for hanging of a deer with the V-screws through the rear legs of the deer.

A significant aspect and feature of the present invention provides for a deer dragging and hanging device for use by either a single person or preferably two persons.

Other significant aspects and features of the present invention include a deer dragging and hanging device which is easily packed into hunting equipment, and which is safe to use.

Having thus described embodiments of the present invention, it is a principal object hereof to provide a deer dragging and hanging device which is used for dragging of a deer out of the woods and hanging of a deer prior to dressing procedures. The device is not limited to deer use, but can also be used with any type of small animal or large animal as it would be proportioned to the particular size of the animal.

One embodiment of the present invention is a deer dragging and hanging device which is useful to the gamesman, such as the hunter, for dragging of a deer or any other like animal, and is sized for the appropriate animal.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DESCRIPTION OF THE PREFERRED EMBODIMENTS

Figure 1:
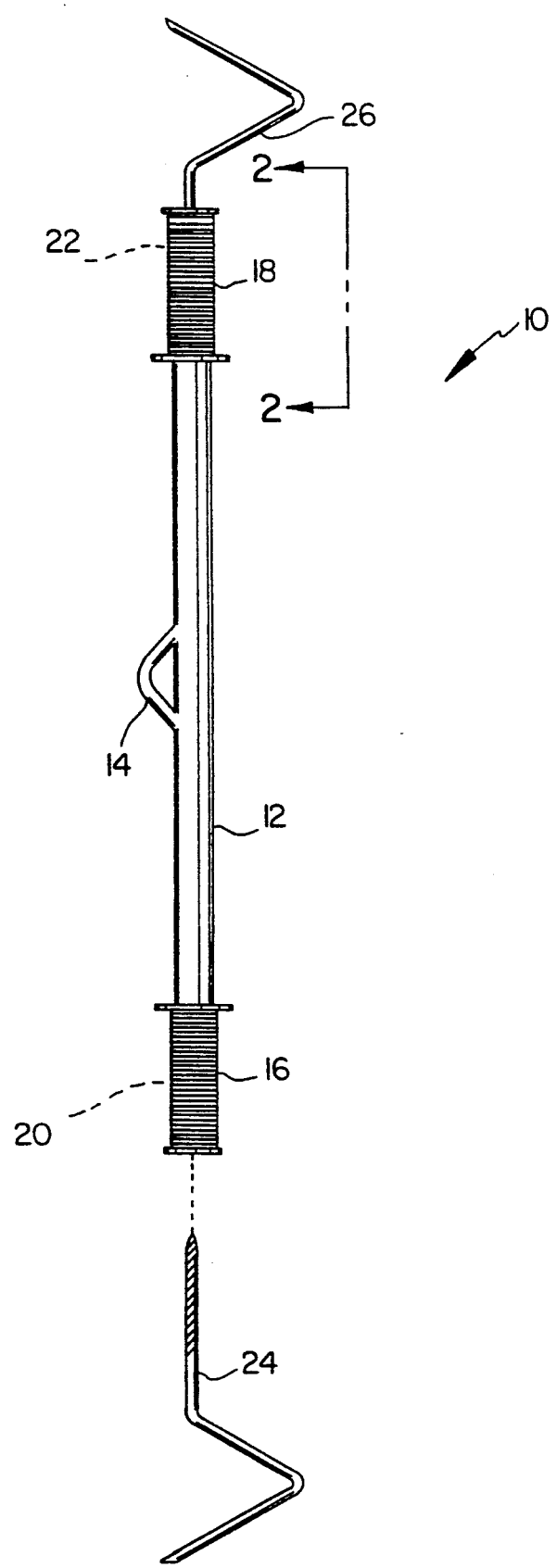
FIG. 1 illustrates a plan view of a deer dragging and hanging device, the present invention.
Figure 2:
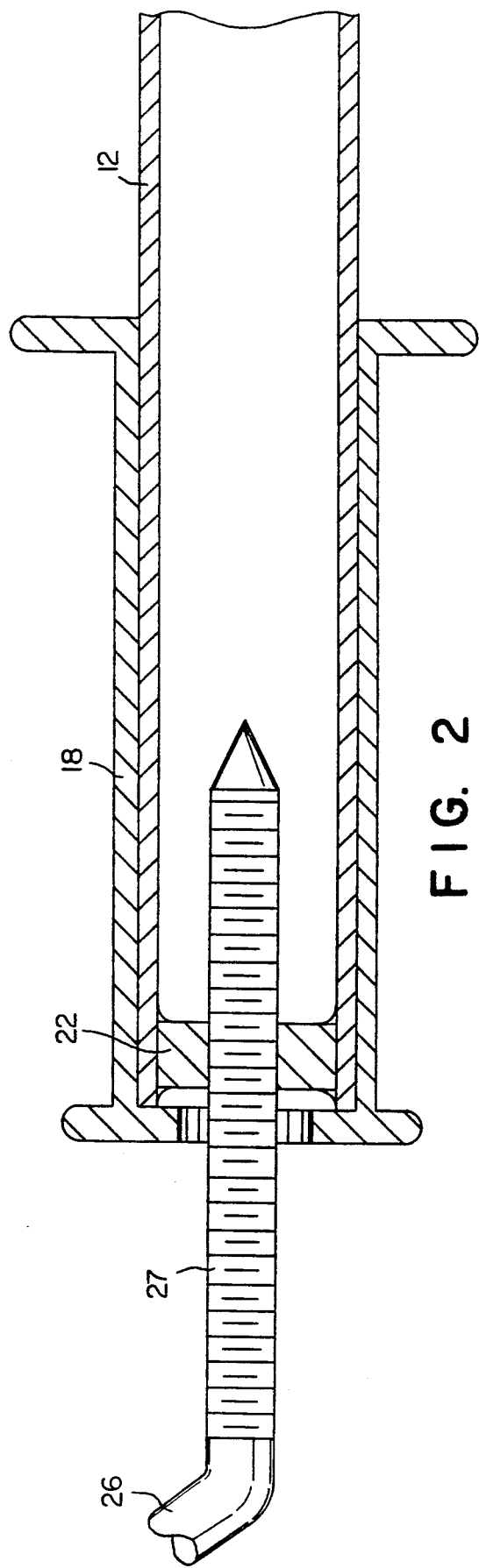
FIG. 2 illustrates a cross-sectional view along line 2—2 of FIG. 1.

FIG. 1 illustrates a plan view of a deer dragging and hanging device 10 including a cylindrical member 12, a yoke 14 secured to a central portion of the cylindrical member 12, and handles 16 and 18 located at opposing ends of the cylindrical member 12. Nuts 20 and 22 engage the ends of the cylindrical member 12 as illustrated in FIG. 2. V-screws 24 and 26 threadingly engage the nuts 20 and 22 and extend into the ends of the cylindrical member 12. The yoke 14 can be welded to the cylindrical member 12. The nuts 20 and 22 can be frictionally engaged, or preferably welded, into the cylindrical member 12. The handles 16 and 18 can be typically foam or rubber - like handles adhesively secured or glued onto the ends of the cylindrical member 12.

FIG. 2 illustrates a cross-sectional view along line 2—2 of FIG. 1 where all numerals correspond to those elements previously described. Illustrated in particular is the nut 22 in welded engagement with the interior end of the cylindrical member 12. Threads 27 of the V-screw 26 threadingly engage the nut 22 so that the V-screw 26 may be adjusted inwardly and outwardly with reference to the cylindrical member 12. The V-screw 24 engages the like-mounted nut 20 in a similar manner.

MODE OF OPERATION

Figure 3:
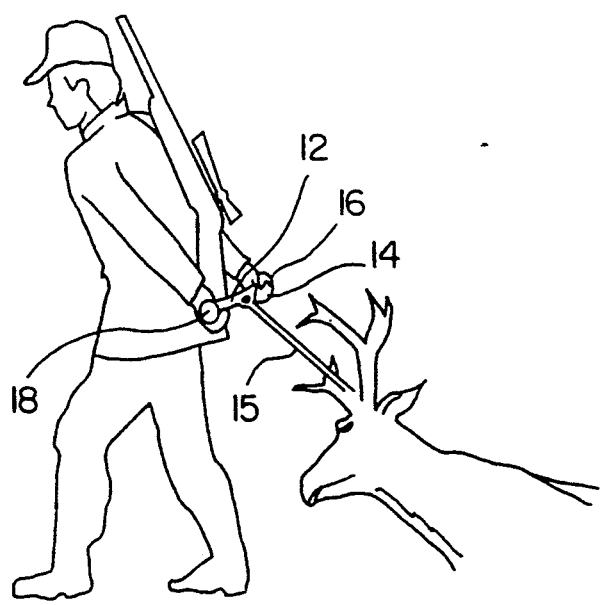
FIG. 3 illustrates a plan view of a hunter dragging a deer.

FIG. 3 illustrates a plan view of a hunter dragging a deer with a rope 15 secured between the yoke 14 and the upper torso of the deer where all numerals correspond to those elements previously described.

Figure 4:
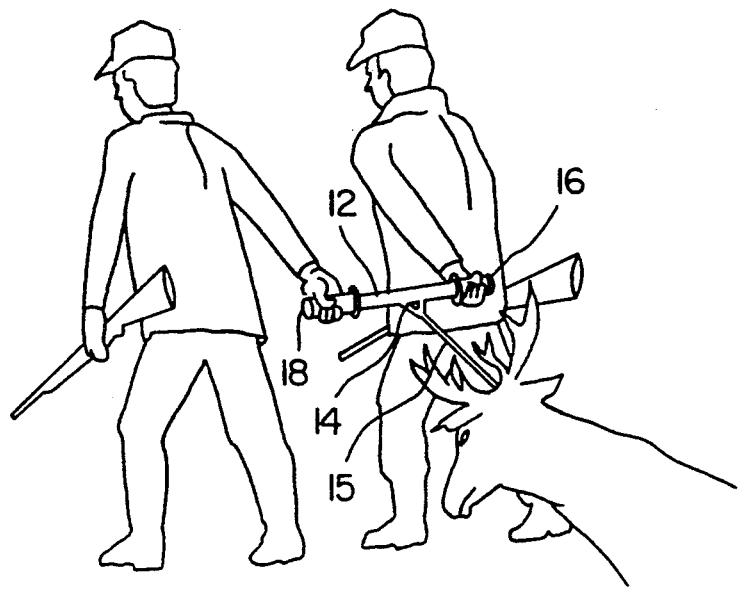
FIG. 4 illustrates a plan view of two hunters dragging a deer.

FIG. 4 illustrates a plan view of two hunters dragging a deer with each of the hunters holding onto each of the handles 16 and 18 with a rope 15 secured between the yoke 14 and the deer where all numerals correspond to those elements previously described.

Figure 5:
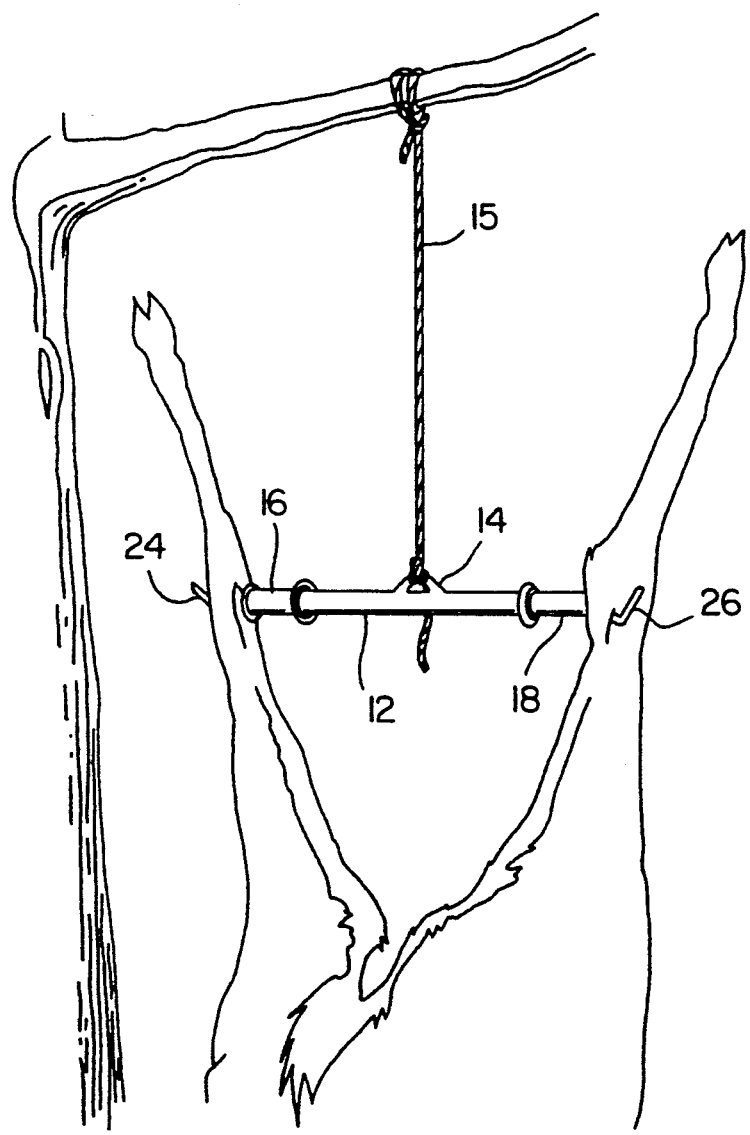
FIG. 5 illustrates a plan view of a deer hung prior to or during dressing.

FIG. 5 illustrates a plan view of a rope 15 secured between a tree and the yoke 14 of the cylindrical member 12 of the deer dragging and hanging device 10 with the V-screws 24 and 26 screwed into the deer's legs so as to secure the deer's legs, for hanging of the deer so that the deer is appropriately positioned for dressing of the deer. All numerals correspond to those elements previously described.

Various modifications can be made to the present invention without departing from the apparent scope hereof.

I claim:
1. A deer dragging and hanging device comprising:
   a. a cylindrical member of a finite length;
   b. a yoke secured to a mid-portion of said cylindrical member;
   c. conforming handles on opposing ends of said cylindrical member;
   d. nuts secured within opposing ends of said cylindrical member; and,
   e. V-screws with threaded ends for threadingly engaging within said nuts at opposing ends of said cylindrical member.

* * * * *